(12) United States Patent
Suh

(10) Patent No.: US 10,153,075 B2
(45) Date of Patent: Dec. 11, 2018

(54) POLYIMIDE-BASED POLYMER THICK FILM RESISTOR COMPOSITION

(71) Applicant: E I DU PONT DE NEMOURS AND COMPANY, Wilmington, DE (US)

(72) Inventor: Seigi Suh, Cary, NC (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/380,210

(22) Filed: Dec. 15, 2016

(65) Prior Publication Data

US 2017/0200539 A1   Jul. 13, 2017

Related U.S. Application Data

(60) Provisional application No. 62/275,986, filed on Jan. 7, 2016.

(51) Int. Cl.
| | | |
|---|---|---|
| H01B 1/24 | (2006.01) | |
| C09D 5/24 | (2006.01) | |
| H01C 17/065 | (2006.01) | |
| C08K 3/04 | (2006.01) | |
| C08K 3/08 | (2006.01) | |
| H01C 7/00 | (2006.01) | |

(52) U.S. Cl.
CPC .......... *H01C 17/0652* (2013.01); *C08K 3/04* (2013.01); *C08K 3/08* (2013.01); *C09D 5/24* (2013.01); *H01B 1/24* (2013.01); *H01C 7/005* (2013.01); *C08K 2003/0806* (2013.01); *C08K 2201/001* (2013.01)

(58) Field of Classification Search
CPC ... H01B 1/00; H01B 1/14; H01B 1/16; H01B 1/18; H01B 1/20; H01B 1/22; H01B 1/24; C09D 5/24
See application file for complete search history.

(56) References Cited

U.S. PATENT DOCUMENTS

| | | | | |
|---|---|---|---|---|
| 6,042,751 | A * | 3/2000 | Chan ................ | G01N 27/3271 204/292 |
| 2003/0100653 | A1 * | 5/2003 | Chacko .............. | H01C 7/005 524/440 |
| 2007/0083017 | A1 * | 4/2007 | Dueber .............. | C08L 63/00 525/423 |
| 2008/0044639 | A1 | 2/2008 | Chan et al. | |
| 2017/0174838 | A1 * | 6/2017 | Suh .................... | C09D 11/00 |

FOREIGN PATENT DOCUMENTS

EP   0531867 A1 *  3/1993

* cited by examiner

*Primary Examiner* — Mark Kopec

(57) ABSTRACT

The invention is directed to a polyimide-based polymer thick film paste composition for forming a polyimide-based polymer thick film resistor, a process for forming the resistor and an electrical device containing a resistor formed using the paste composition The paste composition comprise a functional component, a polyimide, and an organic solvent and can be cured by heating.

7 Claims, No Drawings

POLYIMIDE-BASED POLYMER THICK FILM RESISTOR COMPOSITION

FIELD OF THE INVENTION

The invention is directed to a paste composition for forming a solderable polyimide-based polymer thick film (PTF) conductor and a process for forming the conductor utilizing the paste

TECHNICAL BACKGROUND OF THE INVENTION

Generally, a thick film composition comprises a functional phase that imparts appropriate electrically functional properties to the composition. The functional phase comprises electrically functional powders dispersed in an organic solvent containing a polymer. These compositions will typically contain a binder, e.g., a glass frit. Such a composition is fired to burn out the polymer and solvent and to impart the electrically functional properties. However, in the case of a polymer thick film, the polymer remains as an integral part of the composition after drying and only the solvent is removed. A processing requirement may include a heat treatment such as curing as known to those skilled in the art of polymer thick film technology.

Polymer thick film (PTF) resistor compositions are screen printable pastes which are used to form resistive elements in electronic applications. Such compositions contain resistive/ or conductive filler material dispersed in polymeric resins which remain an integral part of the final composition after processing. The compositions can be processed at relatively low temperatures, namely the temperatures required to cure the resin. The actual resistivity/conductivity of the compositions will vary depending on the desired end use. PTF materials have received wide acceptance in commercial products, notably for flexible membrane switches, touch keyboards, automotive parts and telecommunications.

Many PTF compositions are only stable up to approximately 200° C. and therefore do not lend them to be used in a process subject to a temperature over 200° C.

It is therefore a primary objective of this invention to produce a PTF resistor paste composition which can be used in higher temperature process or operation conditions.

SUMMARY OF THE INVENTION

This invention provides a polyimide-based polymer thick film paste composition for forming a polyimide-based polymer thick film resistor, the paste composition comprising:
  (a) 5-70 wt % of a functional component selected from the group of powders consisting of carbon, carbon black, graphite, graphene, and mixtures thereof;
  (b) 5-25 wt % of a polyimide polymer;
  (c) 0-1 wt % of a dispersant; and
  (d) 30-70 wt % of an organic solvent,
wherein the wt % are based on the total weight of said paste composition, said functional component is dispersed in and said polyimide polymer, said dispersant and said cross-linking agent are dissolved in said organic solvent and the ratio of the weight of said polyimide polymer to the weight of said functional component is between 0.1 and 3.

In one embodiment, the functional component is graphite powder. In another embodiment, the functional component is a mixture of graphite powder and carbonblack powder.

The invention also provides a polyimide-based polymer thick film paste composition for forming a polyimide-based polymer thick film resistor, the paste composition comprising:
  (a) 5-70 wt % of a functional component that is a mixture of
    i) a powder selected from the group of powders consisting of carbon, black, graphite, graphene, and mixtures thereof; and
    ii) an electrical conductive metal powder wherein said metal is selected from the group consisting of Ag, Cu, Au, Pd, Pt, Sn, Al, Ni, an alloy of Ag, Cu, Au, Pd, Pt, Sn, Al, Ni and mixtures thereof, wherein said electrical conductive metal powder is 0.1-98 wt % of said functional component;
  (b) 5-25 wt % of a polyimide polymer;
  (c) 0-1 wt % of a dispersant; and
  (d) 30-70 wt % of an organic solvent,
wherein the wt % of said functional component, said polyimide polymer, said dispersant, said cross-linking agent and said solvent are based on the total weight of said paste composition, said functional component is dispersed in and said polyimide polymer, said dispersant and said cross-linking agent are dissolved in said organic solvent and the ratio of the weight of said polyimide polymer to the weight of said functional component is between 0.1 and 3.

In one embodiment, the electrical conductive metal powder is silver powder. In an embodiment, the functional component is a mixture of graphite powder, carbon black powder and silver powder.

In the polyimide-based PTF paste compositions of the invention, the polyimide polymer is represented by the structure I:

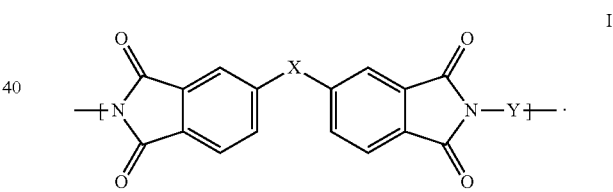

wherein X is $C(CH_3)_2$, O, $S(O)_2$, $C(CF_3)_2$, O-Ph-$C(CH_3)_2$-Ph-O, O-Ph-O— or a mixture thereof; and wherein Y is a diamine component or a mixture of diamine components selected from the group consisting of: m-phenylenediamine (MPD), 3,4'-diaminodiphenyl ether (3,4'-ODA), 4,4'-diamino-2,2'-bis(trifluoromethyl)biphenyl (TFMB), 3,3'-diaminodiphenyl sulfone (3,3'-DDS), 4,4'-(Hexafluoroisopropylidene)bis(2-aminophenol) (6F-AP), bis-(4-(4-aminophenoxy)phenyl)sulfone (BAPS), 9,9-bis(4-aminophenyl)fluorene (FDA); 2,3,5,6-tetramethyl-1,4-phenylenediamine (DAM), 2,2-bis[4-(4-aminophenoxyphenyl)]propane (BAPP), 2,2-bis[4-(4-aminophenoxyphenyl)] hexafluoropropane (HFBAPP), 1,3-bis(3-aminophenoxy) benzene (APB-133), 2,2-bis(3-aminophenyl)hexafluoropropane, 2,2-bis(4 aminophenyl) hexafluoropropane (bis-A-AF), 4,4'-bis(4-amino-2-trifluoromethylphenoxy) biphenyl, 4,4'-[1,3-phenylenebis (1-methyl-ethylidene)], and bisaniline (bisaniline-M) with the following provisos:
  i) if X is O, then Y is not MPD, BAPS, 3,4'-ODA, BAPP, APB-133, or bisaniline-M;
  ii) if X is $S(O)_2$, then Y is not 3,3'-DDS;

iii) if X is O-Ph-C(CH$_3$)$_2$-Ph-O or O-Ph-O—, then Y is not MPD, FDA, 3,4'-ODA, DAM, BAPP, APB-133, or bisaniline-M;
iv) if X is C(CF$_3$)$_2$, then Y is not MPD, BAPS, FDA, or 3,3'-DDS.

In some embodiments, the organic solvent comprises one or more components selected from the group with structures II, III, IV, V and VI:

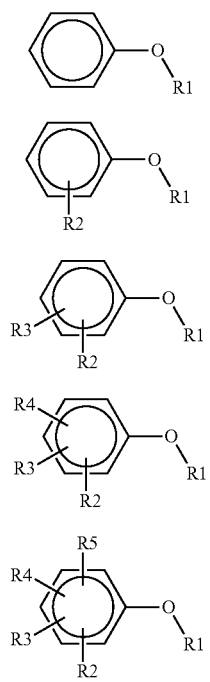

wherein R1=CH$_3$, CH$_2$CH$_3$, CH$_2$CH$_2$CH$_3$, or CH(CH$_3$)$_2$; R2=CH$_3$, CH$_2$CH$_3$, OCH$_3$, OCH$_2$CH$_3$, OCF$_3$, C(O)OCH$_3$, CH$_2$Cl, F or Cl; R3=H, F, CH$_3$, CH$_2$CH$_3$ or OCH$_3$; R4=F, CH$_3$ or CH$_2$CH$_3$ and R5=F or CH, In an embodiment, the organic solvent comprises one or more aryl alkyl ethers.

The invention also provides an electrical device containing a polyimide-based polymer thick film resistor formed from one of the polyimide-based polymer thick film paste compositions of the invention.

The invention further provides a process for forming a polyimide-based polymer thick film resistor, comprising the steps of:
(i) providing a substrate;
(ii) preparing one of the polyimide-based polymer thick film paste compositions of the invention;
(iii) forming a resistor pattern by applying said paste composition in the desired pattern onto said substrate; and
(iv) curing said paste composition applied in step (iii) by heating at a temperature of 80 to 380° C. to form said polyimide-based polymer thick film resistor.

In one embodiment of the process, after step (iii) but before step (iv) the paste composition applied in step (iii) is dried by heating at a temperature sufficient to remove the organic solvent.

The invention also provides an electrical device containing a polyimide-based polymer thick film resistor formed using the process of the invention.

DETAILED DESCRIPTION OF INVENTION

The invention relates to a paste composition for forming a polyimide-based polymer thick film (PTF) resistor and a process for forming the resistor utilizing the paste. The paste is typically used In an electrical device to form an electrical resistor on the surface of a substrate.

The main components of the instant polyimide-based polymer thick film paste composition are a functional component, a polyimide polymer, and an organic solvent. A dispersant is an optional component.

Weight percent is written herein as wt %.
Functional Component

In one embodiment, the functional component is selected from the group of powders consisting of carbon, carbon black, graphite, graphene, and mixtures thereof In one such embodiment, the functional component is graphite powder. In another such embodiment, the functional component is a mixture of graphite powder. and carbon black powder.

This functional component is 5-70 wt % based on the total weight of the paste composition. In one embodiment the functional component is 5-40 wt % based on the total weight of the paste composition.

In another embodiment, a functional component that is a mixture of
 i) a powder selected from the group of powders consisting of carbon, black, graphite, graphene, and mixtures thereof; and
 ii) an electrical conductive metal powder wherein said metal is selected from the group consisting of Ag, Cu, Au, Pd, Pt, Sn, Al, Ni, an alloy of Ag, Cu, Au, Pd, Pt, Sn, Al, Ni and mixtures thereof, wherein said electrical conductive metal powder is 0.1-98 wt % of said functional component;

The electrically conductive metal powder in the present polymer thick film composition is a powder of electrically conductive metal particles.

In one embodiment the electrically conductive metal is selected from the group consisting of Ag, Cu, Au, Pd, Pt, Sn, Al, Ni and mixtures thereof In an embodiment, the conductive particles may include silver (Ag). In a further embodiment, the conductive particles may, for example, include one or more of the following: Ag, Cu, Au, Pd, Pt, Sn, Al, Ni, Ag—Pd and Pt—Au. In another embodiment, the conductive particles may include one or more of the following: (1) Al, Cu, Au, Ag, Pd and Pt; (2) an alloy of Al, Cu, Au, Ag, Pd and Pt; and (3) mixtures thereof. In still another embodiment, the conductive particles may include one of the above mentioned metals coated with another of the metals, e.g., Ag-coated Cu, Ag-coated-Ni. An embodiment may contain a mixture of any of the above.

When the metal is silver, it can be in the form of silver metal, alloys of silver or mixtures thereof. The silver can also be in the form of silver oxide (Ag$_2$O), silver salts such as AgCl, AgNO$_3$, AgOOCCH$_3$ (silver acetate), AgOOCF$_3$ (silver trifluoroacetate), silver orthophosphate (Ag$_3$PO$_4$) or mixtures thereof. Other forms of silver compatible with the other thick-film paste components can also be used.

The source of the electrically conductive metal can be in a flake form, a spherical form, a granular form, a crystalline form, other irregular forms and mixtures thereof.

This functional component mixture is 5-70 wt % based on the total weight of the paste composition. In one embodiment, the electrically conductive metal is from about 0.1 to about 98 wt % of the functional component. In a further embodiment, the source of the electrically conductive metal is from about 50 to about 95 wt % of the solid components of the functional component.

The particle size of the electrically conductive metal is not subject to any particular limitation. In an embodiment, the average particle size may be less than 10 microns, and, in a further embodiment, no more than 5 microns. In an aspect, the average particle size may be 0.1 to 5 microns, for example. As used herein, "particle size" is intended to mean "average particle size"; "average particle size" means the 50% volume distribution size. The 50% volume distribution size can be denoted as $D_{50}$. Volume distribution size may be determined by a number of methods understood by one of skill in the art, including but not limited to laser diffraction and dispersion method using a Microtrac particle size analyzer (Montgomeryville, Pa.). Laser light scattering, e.g., using a model LA-910 particle size analyzer available commercially from Horiba Instruments Inc. (Irvine, Calif.), may also be employed.

Polyimide Polymer

The polyimide polymer is represented by the structure I:

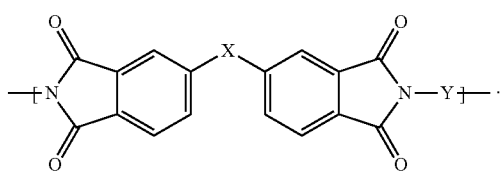

I wherein X is $C(CH_3)_2$, O, $S(O)_2$, $C(CF_3)_2$, O-Ph-$C(CH_3)_2$-Ph-O, O-Ph-O— or a mixture thereof; and wherein Y is a diamine component or a mixture of diamine components selected from the group consisting of: m-phenylenediamine (MPD), 3,4'-diaminodiphenyl ether (3,4'-ODA), 4,4'-diamino-2,2'-bis(trifluoromethyl)biphenyl (TFMB), 3,3'-diaminodiphenyl sulfone (3,3'-DDS), 4,4'-(Hexafluoroisopropylidene)bis(2-aminophenol) (6F-AP), bis-(4-(4-aminophenoxy)phenyl)sulfone (BAPS), 9,9-bis(4-aminophenyl)fluorene (FDA); 2,3,5,6-tetramethyl-1,4-phenylenediamine (DAM), 2,2-bis[4-(4-aminophenoxyphenyl)]propane (BAPP), 2,2-bis[4-(4-aminophenoxyphenyl)] hexafluoropropane (HFBAPP), 1,3-bis(3-aminophenoxy) benzene (APB-133), 2,2-bis(3-aminophenyl)hexafluoropropane, 2,2-bis(4 aminophenyl) hexafluoropropane (bis-A-AF), 4,4'-bis(4-amino-2-trifluoromethylphenoxy) biphenyl, 4,4'-[1,3-phenylenebis (1-methyl-ethylidene)], and bisaniline (bisaniline-M) with the following provisos:
  i) if X is O, then Y is not MPD, BAPS, 3,4'-ODA, BAPP, APB-133, or bisaniline-M;
  ii) if X is $S(O)_2$, then Y is not 3,3'-DDS;
  iii) if X is O-Ph-$C(CH_3)_2$-Ph-O or O-Ph-O—, then Y is not MPD FDA, 3,4'-ODA, DAM, BAPP, APB-133, or bisaniline-M;
  iv) if X is $C(CF_3)_2$, then Y is not MPD, BAPS, FDA, or 3,3'-DDS.

Some combinations of X and Y do not result in polyimide polymers that are useful in the compositions of the invention and these are excluded by the various provisos.

Polyimide polymers are generally prepared from a dianhydride, or the corresponding diacid-diester, diacid halide ester, or tetra-carboxylic acid derivative of the dianhydride, and a diamine.

For purposes of the present invention, a particular group of dianhydrides was discovered to be particularly useful in the preparation of water resistant polyimide pastes. These dianhydrides are 4,4'-oxydiphthalic anhydride (ODPA), bis (3,4-dicarboxyphenyl)sulfoxide dianhydride (DSDA), 2,2-bis-(3,4-dicarboxyphenyl) 1,1,1,3,3,3,-hexafluoropropane dianhydride (6-FDA) and 4,4'-(4,4'-isopropylidenediphenoxy)bis-(phthalic anhydride) (BPADA). For the non-fluorinated polyimide pastes these dianhydrides are 4,4'-oxydiphthalic anhydride (ODPA), bis(3,4-dicarboxyphenyl) sulfoxide dianhydride (DSDA), and 4,4'-(4,4'-isopropylidenediphenoxy)bis-(phthalic anhydride) (BPADA).

For purposes of the present invention, a particular group of diamines was discovered to be particularly useful in the preparation of water resistant polyimide solutions and pastes. These diamines are m-phenylenediamine (MPD), 3,4'-diaminodiphenyl ether (3,4'-ODA), 4,4'-diamino-2,2'-bis(trifluoromethyl)biphenyl (TFMB), 3,3'-diaminodiphenyl sulfone (3,3'-DDS), 4,4'-(hexafluoroisopropylidene)bis(2-aminophenol) (6F-AP), bis-(4-(4-aminophenoxy)phenyl) sulfone (BAPS), 9,9-bis(4-aminophenyl)fluorene (FDA); 2,3,5,6-tetramethyl-1,4-phenylenediamine (DAM), 2,2-bis [4-(4-aminophenoxyphenyl)]propane (BAPP), 2,2-bis[4-(4-aminophenoxyphenyl)] hexafluoropropane (HFBAPP), 1,3-bis(3-aminophenoxy) benzene (APB-133), 2,2-bis(3-aminophenyl)hexafluoropropane, 2,2-bis(4 aminophenyl) hexafluoropropane (bis-A-AF), 4,4'-bis(4-amino-2-trifluoromethylphenoxy) biphenyl, 4,4'-[1,3-phenylenebis (1-methyl-ethylidene)], and bisaniline (bisaniline-M).

For the non-fluorinated polyimide polymer pastes these diamines are m-phenylenediamine (MPD), 3,4'-diaminodiphenyl ether (3,4'-ODA), 3,3'-diaminodiphenyl sulfone (3,3'-DDS), bis-(4-(4-aminophenoxy)phenyl)sulfone (BAPS), 2,3,5,6-tetramethyl-1,4-phenylenediamine (DAM), 2,2-bis[4-(4-aminophenoxyphenyl)]propane (BAPP), 1,3-bis(3-aminophenoxy) benzene (APB-133), 4,4'-bis(4-amino-2-trifluoromethylphenoxy) biphenyl, 4,4'-[1,3-phenylenebis(1-methyl-ethylidene)], and bisaniline (bisaniline-M).

As indicated previously, some combinations of these dianhydrides and diamines will not form a useful polyimide solution paste. For instance, if ODPA is selected as the dianhydride and either MPD, BAPS 3,4'-ODA, BAPP, APB-133, or bisaniline-M is chosen as the diamine, a less useful polyimide is formed. In addition, if DSDA is selected as the dianhydride, then 3,3'-DDS is not a useful diamine. These and other combinations that are not useful are excluded by the various provisos. However, all other combinations of the diamines and dianhydrides disclosed herein will form useful polyimide polymers for the purposes of this invention.

In one embodiment the polyimide can be prepared in the dry and powdered state by reacting monomers 2,2'-Bis (trifluoromethyl)-4,4'-diamino biphenyl (TFMB), 2,2Bis(3-amino-4-hydroxyphenyl)hexafluoropropane (6F-AP) and Hexafluoroisopropylidenebis-phthalic dianhydride (6-FDA). in a ratio of 33/10/57 (TFMB/6F-AP/6-FDA) through the well-known process of first making polyamic acid in N,N-Dimethylacetamide (DMAC) solvent, controlling the molecular weight of said polyamic acid with endcapping additives, then chemically imidizing and precipitating the polyimide polymer using methanol neat additions to the DMAC solution. The precipitate was washed several times with methanol neat, filtered and then dried at approximately 200° C. to form a dry and handleable powder and to reduce DMAC residuals to below 0.1% weight. The resulting powder can be dried and stored at room temperature or dissolved in a solvent in preparation for forming the paste composition.

In one embodiment, the polyimide polymer is from about 5 to about 25 wt % of the polymer thick film paste composition.

In one embodiment, the ratio of the weight of the polyimide polymer to the weight of the functional component is between 0.1 and 3.

Organic Solvent

The functional component powder is dispersed in and the polyimide polymer is dissolved in the organic solvent. The functional component powder is dispersed by mechanical mixing to form a paste like composition having suitable consistency and rheology for printing.

The solvent must be one which can dissolve the polyimide polymer and in which the functional component powder is dispersible with an adequate degree of stability. The organic solvent is one that can be boiled off at relatively low temperature. The rheological properties of the solvent must be such that they lend good application properties to the composition. Such properties include dispersion of the functional component powder with an adequate degree of stability, good application of composition, appropriate viscosity, thixotropy, appropriate wettability of the substrate and the electrically conductive metal powder and a good drying rate.

Solvents suitable for use in the polyimide-based polymer thick film paste composition are acetates and terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. In embodiments of the present invention, solvents such as glycol ethers, ketones, esters and other solvents of like boiling points (in the range of 180° C. to 250° C.), and mixtures thereof may be used. In one embodiment, the solvent is one or more components selected from the group consisting butyl carbitol acetate, dibasic acetates, diethyl adipate and triethylphosphate. Various combinations of these and other solvents are formulated to obtain the viscosity and volatility requirements desired. In addition, volatile liquids for promoting rapid hardening after application on the substrate may be included in the organic vehicle.

In some embodiments, the organic solvent comprises one or more components selected from the group with structures II, III, IV, V and VI:

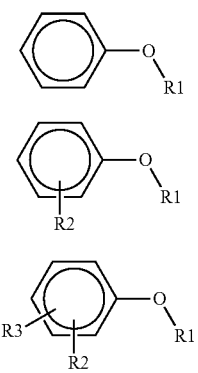

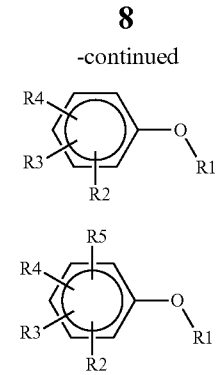

wherein R1=CH$_3$, CH$_2$CH$_3$, CH$_2$CH$_2$CH$_3$, or CH(CH$_3$)$_2$; R2=CH$_3$, CH$_2$CH$_3$, OCH$_3$, OCH$_2$CH$_3$, OCF$_3$, C(O)OCH$_3$, CH$_2$Cl, F or Cl; R3=H, F, CH$_3$, CH$_2$CH$_3$ or OCH$_3$; R4=F, CH$_3$ or CH$_2$CH$_3$ and R5=F or CH, In an embodiment, The polyimide polymer is fluorinated or non-fluorinated and the organic solvent comprises one or more aryl alkyl ethers.

In one embodiment, the organic solvent is present from 30-70 wt % of the total weight of the paste composition.

Application of Polymer Thick Films

The polymer thick film paste composition is deposited on a substrate typical of those used in electric devices. In a typical embodiment, the substrate is impermeable to gases and moisture. The substrate can be a sheet of flexible material. The flexible material can be an impermeable material such as a polyimide film, e.g. Kapton®. The material can also be a polyester, e.g. polyethylene terephthalate, or a composite material made up of a combination of plastic sheet with optional metallic or dielectric layers deposited thereupon.

The deposition of the polymer thick film composition is performed preferably by screen printing, although other deposition techniques such as stencil printing, syringe dispensing or coating techniques can be utilized. In the case of screen-printing, the screen mesh size controls the thickness of deposited thick film.

The deposited thick film conductive composition is dried, i.e., the solvent is evaporated, by exposure to heat, e.g. at 130° C. for minutes. The paste is then cured by heating at a temperature of 80 to 380° C. for at least 30 minutes to form the polyimide-based polymer thick film resistor.

EXAMPLES

The polyimide substrates used in the Examples were Kapton® 500HPP-ST films (obtained from the DuPont Co, Wilmington, Del.) and used as received after cut into 2.5"×3.5" pieces.

The polyimide polymer #1 was prepared as described above by reacting TFMB, 6F-AP and 6-FDA in a ratio of 33/10/57.

The polyimide polymer #2 was prepared as described above by reacting TFMB and 6-FDA in a ratio of 42/58

The polyimide polymer #3 was prepared as described above by reacting APB133 and BPADA in a ratio of 1/1

The graphite was obtained from Ashylen (HPN-10)

Both carbon black #1 (MONARCH 120) and carbon black #2 (VULCAN XC72R) were obtained from Cabot Corp.

A silicone oil purchased from Aldrich (product #146153) was used as a source of polydimethylsiloxne (PDMS).

When a non-conductive substrate is used the conductive terminations were formed on a substrate using either Termination #1, a screen printable PTF Ag paste for curing up to 300° C. or Termination #2, a screen printable PTF Ag paste for curing above 300° C.

Termination #1

A screen printable PTF Ag paste was used to form the conductive terminations. The components of the PTF silver conductor composition were:

| | |
|---|---|
| 84 wt % | silver powder |
| 3.4 wt % | polyimide |
| 5.3 wt % | butylcarbitol acetate |
| 2 wt % | dibasic acetates (DBE-3) |
| 5.3 wt % | diethyl adipate | wherein the wt % are based on the total weight of the composition.

Termination #2

A screen printable PTF Ag paste was used to form the conductive terminations. The components of the PTF silver conductor composition were:

| | |
|---|---|
| 79.1 wt % | silver powder |
| 4 wt % | polyimide |
| 16.5 wt % | triethylphosphate |
| 0.2 wt % | oleic acid |
| 0.2 wt % | silicon oil (PDMS) | wherein the wt % are based on the total weight of the composition.

TCR (thermal coefficient of resistance) was measured and reported in ppm/° C. for both hot TCR (HTCR) at 125° C. and cold TCR (CTCR) at −40° C. A minimum of 3 specimens for each Example, each containing 8 resistors, was used and the TCR results are an average of these measurements Example 1

A screen printable polyimide-based PTF paste composition for forming a resistor was prepared using graphite as the functional component. The components of the PTF resistor composition were:

| | |
|---|---|
| 19.7 wt % | graphite |
| 21.3 wt % | polyimide polymer #1 |
| 59 wt % | triethylphosphate solvent | wherein the wt % are based on the total weight of the composition. The ratio of the weight of the polyimide polymer (PP) to the weight of the graphite powder functional component (FC) was 1.08.

The components were combined and mixed for 30-60 seconds in a Thinky-type mixer, and then roll-milled. The composition was used to screen print a resistor paste pattern on Kapton® 500HPP-ST polyimide film using a 325 mesh stainless steel screen. The PTF Ag conductor terminations were printed using a 325 mesh stainless steel screen and Termination #2. The resistor paste was deposited and cured at 120° C. for 20 min. Both the resistor paste and the conductor terminations were cured at 350° C. for 30 min. Several such resistors with terminations were printed. The average resistance was 560Ω/□ at an average thickness of 8 μm.

Examples 2-5

Screen printable polyimide-based PTF paste compositions for forming resistors were prepared for each Example using the compositions shown in Table I. The % FC is the weight percent of the functional component (FC) which was a mixture of graphite and carbon black #1 in a ratio of 7.25 to 9.35. The polyimide polymer (PP) was polyimide polymer #2 and % PP is the weight percent of the polyimide polymer. The solvent is a mixture of DBE-3, diethyl adipate and butylcarbitol acetate and % Solvent is the weight percent of the solvent. All weight percent are based on the total weight of the paste composition. The ratio of the weight of the polyimide polymer (PP) to the weight of the functional component (FC) is shown for each Example.

TABLE I

| Example | % FC | % PP | % Solvent | PP/FC |
|---|---|---|---|---|
| 2 | 23.74 | 19.51 | 56.75 | 0.82 |
| 3 | 11.87 | 11.87 | 76.26 | 1 |
| 4 | 14.74 | 22.1 | 63.16 | 1.5 |
| 5 | 8.78 | 17.56 | 73.66 | 2 |

The components of each Example were combined and mixed for 30-60 seconds in a Thinky-type mixer, and then roll-milled. The substrate was Kapton® 500HPP-ST polyimide film. The PTF Ag conductor terminations were printed using a 200 mesh stainless steel screen and Termination #1 and then cured at 200° C. for 30 min. The composition of each Example was used to screen print a resistor paste pattern using a 200 mesh stainless steel screen. The resistor paste was cured at 130° C. for 10 min, and then cured at 200° C. for 60 min. Several such resistors with terminations were printed. The average resistance, resistor thickness, HTCR and LTCR obtained from the compositions are summarized in Table II.

TABLE II

| Example | PP/FC | Ω/□ | HTCR (+125° C.) ppm/° C. | CTCR (−55° C.) ppm/° C. | Resistor Thickness (μm) |
|---|---|---|---|---|---|
| 2 | 0.82 | 45 | −21 | −250 | 15 |
| 3 | 1 | 78 | +5 | −239 | 15 |
| 4 | 1.5 | 340 | +84 | −213 | 12 |
| 5 | 2 | 3210 | +204 | −200 | 12 |

Example 6-8

Screen printable polyimide-based PTF paste compositions for forming resistors were prepared for each Example using the compositions shown in Table III. The % FC is the weight percent of the functional component (FC) which was a mixture of graphite and carbon black #2 in a ratio of 14 to 6. The polyimide polymer (PP) was polyimide polymer #2 and % PP is the weight percent of the polyimide polymer. The solvent is a mixture of DBE-3, diethyl adipate and butylcarbitol acetate and % Solvent is the weight percent of the solvent. All weight percent are based on the total weight of the paste composition. The ratio of the weight of the polyimide polymer (PP) to the weight of the functional component (FC) is shown for each Example.

The components of each Example were combined and mixed for 30-60 seconds in a Thinky-type mixer, and then roll-milled. The substrate was Kapton® 500HPP-ST polyimide film. The PTF Ag conductor terminations were printed using a 200 mesh stainless steel screen and Termination #1 and then cured at 200° C. for 30 min. The composition of each Example was used to screen print a resistor paste pattern using a 200 mesh stainless steel screen. The resistor paste was cured at 130° C. for 10 min, and then cured at 200° C. for 60 min. Several such resistors with terminations were printed. The average resistance, resistor thickness, HTCR and LTCR obtained from the compositions are summarized in Table III.

TABLE III

| Example | % FC | % PP | % Solvent | PP/FC | Ω/□ | Thickness (μm) |
|---|---|---|---|---|---|---|
| 6 | 23.5 | 15.3 | 61.2 | 0.65 | 13 | 16 |
| 7 | 18.2 | 17.7 | 64.1 | 0.97 | 23 | 17 |
| 8 | 15.6 | 18.9 | 65.5 | 1.21 | 55 | 15 |

Example 9

A screen printable polyimide-based PTF paste composition for forming a resistor was prepared using the composition shown in Table IV. The % FC is the weight percent of the functional component (FC) which was a mixture of graphite and carbon black #2 in a ratio of 20.15 to 19. The polyimide polymer (PP) was polyimide polymer #2 and % PP is the weight percent of the polyimide polymer. The solvent is a mixture of DBE-3, diethyl adipate and butylcarbitol acetate and % Solvent is the weight percent of the solvent. Sorbitan monolaurate (Span 20) was used as a dispersant. All weight percent are based on the total weight of the paste composition. The ratio of the weight of the polyimide polymer (PP) to the weight of the functional component (FC) was 1.07.

TABLE IV

| Example | % FC | % PP | % Solvent | % Span 20 | PP/FC |
|---|---|---|---|---|---|
| 9 | 18.69 | 19.93 | 61.18 | 0.2 | 1.07 |

The components were combined and mixed for 30-60 seconds in a Thinky-type mixer, and then roll-milled. The substrates were Kapton® 500HPP-ST polyimide film or alumina. The PTF Ag conductor terminations were printed using a 200 mesh stainless steel screen and Termination #1 and then cured at 200° C. for 30 min. The polyimide-based PTF paste composition was used to screen print the resistor paste composition using a 200 mesh stainless steel screen. The resistor paste was cured at 130° C. for 10 min, and then cured at 200° C. for 60 min. Several such resistors with terminations were printed. The average resistance after curing the resistor paste at 130° C. was 27Ω/□ and after curing at 200° C. was 34Ω/□. The average resistor thickness was 15 μm.

Example 10-13

The compositions of Examples 2, 3, 4, and 6 were used to screen print resistor paste patterns on Kapton® 500HPP-ST with the PTF Ag conductor terminations printed and cured using Termination #2. Using a 200 mesh stainless steel screen, several patterns were printed, and the resistor paste was deposited, first cured at 130° C. for 10 min, and then cured either for 30 min at 300° C. or for 30 min at 350° C. The resistance measured after the curing steps indicated that the higher curing temperature yielded the higher resistance as shown in Table V below.

TABLE V

| | Composition | Resistor | Resistance (Ω/□) | | |
|---|---|---|---|---|---|
| Example | from Example | Thickness (μm) | 200° C. | 300° C. | 350° C. |
| 10 | 2 | 15 | 45 | 95 | 200 |
| 11 | 3 | 15 | 80 | 175 | 410 |
| 12 | 4 | 12 | 340 | 850 | 3300 |
| 13 | 6 | 16 | 13 | 25 | 30 |

Example 14

A screen printable polyimide-based PTF paste composition for forming a resistor was prepared with a functional component that was a mixture of graphite. carbon black and silver powders. The components of the PTF paste composition were:

| 2.2 wt % | graphite |
|---|---|
| 2.1 wt % | carbon black #2 |
| 62 wt % | silver powder |
| 7.5 wt % | polyimide polymer #2 |
| 12.2 wt % | butylcarbitol acetate |
| 4 wt % | dibasic acetates (DBE-3) |
| 10 wt % | diethyl adipate | wherein the wt % are based on the total weight of the composition. The ratio of the weight of the polyimide polymer (PP) to the weight of the functional component (FC) was 0.11.

The components were combined and mixed for 30-60 seconds in a Thinky-type mixer, and then roll-milled. The substrate was Kapton® 500HPP-ST polyimide film. The PTF Ag conductor terminations were printed using a 200 mesh stainless steel screen and Termination #1 and then cured at 200° C. for 30 min. The polyimide-based PTF paste composition was used to screen print a resistor paste pattern using a 280 mesh stainless steel screen. The resistor paste was cured at 130° C. for 10 min, and then cured at 200° C. for 90 min. Several such resistors with terminations were printed. The average resistance after curing the resistor paste at 200° C. was 0.5Ω/□. The average resistor thickness was 13 μm.

Example 15

A screen printable polyimide-based PTF paste composition for forming a resistor was prepared with a functional component that was a mixture of graphite and carbon black powders. The components of the PTF paste composition were:

| 8.9 wt % | graphite |
|---|---|
| 11.8 wt % | carbon black #1 |
| 21.9 wt % | polyimide polymer #3 |
| 57.4 wt % | 1,2-dimethoxybenzene | wherein the wt % are based on the total weight of the composition. The ratio of the weight of the polyimide polymer (PP) to the weight of the functional component (FC) was 1.06.

The components were combined and mixed for 30-60 seconds in a Thinky-type mixer, and then roll-milled. The substrate was Kapton® 500HPP-ST polyimide film. The PTF Ag conductor terminations were printed using a 200 mesh stainless steel screen and Termination #1 and then cured at 200° C. for 30 min. The polyimide-based PTF paste composition was used to screen print a resistor paste pattern using a 200 mesh stainless steel screen. The resistor paste was cured at 130° C. for 10 min, and then cured at 200° C. for 90 min. Several such resistors with terminations were printed. The average resistance after curing the resistor paste at 200° C. was 1 kΩ/□. The average resistor thickness was 23 μm.

What is claimed is:

1. A polyimide-based polymer thick film paste composition for forming a polyimide-based polymer thick film resistor, the paste composition comprising:
   (a) 35-70 wt % of a functional component selected from the group of powders consisting of carbon, carbon black, graphite, graphene, and mixtures thereof;
   (b) 5-25 wt % of a polyimide polymer;
   (c) 0-1 wt % of a dispersant; and
   (d) 30-70 wt % of an organic solvent,
wherein the wt % are based on the total weight of said paste composition, said functional component is dispersed in and said polyimide polymer and said dispersant are dissolved in said organic solvent and the ratio of the weight of said polyimide polymer to the weight of said functional component is between 0.1 and 3.

2. The polyimide-based polymer thick film paste composition of claim 1, wherein said functional component is graphite powder.

3. The polyimide-based polymer thick film paste composition of claim 1, wherein said functional component is a mixture of graphite powder and carbon black powder.

4. A polyimide-based polymer thick film paste composition for forming a polyimide-based polymer thick film resistor, the paste composition comprising:
   (a) 35-70 wt % of a functional component that is a mixture of
      i) a powder selected from the group of powders consisting of carbon, carbon black, graphite, graphene, and mixtures thereof; and
      ii) an electrical conductive metal powder wherein said metal is selected from the group consisting of Ag, Cu, Au, Pd, Pt, Sn, Al, Ni, an alloy of Ag, Cu, Au, Pd, Pt, Sn, Al, Ni and mixtures thereof, wherein said electrical conductive metal powder is 0.1-98 wt % of said functional component;
   (b) 5-25 wt % of a polyimide polymer;
   (c) 0-1 wt % of a dispersant; and
   (d) 30-70 wt % of an organic solvent,
wherein the wt % of said functional component, said polyimide polymer, said dispersant, said cross-linking agent and said solvent are based on the total weight of said paste composition, said functional component is dispersed in and said polyimide polymer and said dispersant are dissolved in said organic solvent and the ratio of the weight of said polyimide polymer to the weight of said functional component is between 0.1 and 3.

5. The polyimide-based polymer thick film paste composition of claim 4, wherein said electrical conductive metal powder is silver powder.

6. The polyimide-based polymer thick film paste composition of claim 4, wherein said functional component is a mixture of graphite powder, carbon black powder and silver powder.

7. The polyimide-based polymer thick film paste composition of claim 4, wherein said electrical conductive metal powder is 50-95 wt % of said functional component.

* * * * *